US011929683B2

(12) United States Patent
Kim et al.

(10) Patent No.: US 11,929,683 B2
(45) Date of Patent: *Mar. 12, 2024

(54) ISOLATED MULTI-PHASE DC/DC CONVERTER WITH REDUCED QUANTITY OF BLOCKING CAPACITORS

(71) Applicant: Delta Electronics, Inc., Taipei (TW)

(72) Inventors: Jong Woo Kim, Cary, NC (US); Peter Mantovanelli Barbosa, Cary, NC (US)

(73) Assignee: DELTA ELECTRONICS, INC., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/812,360

(22) Filed: Jul. 13, 2022

(65) Prior Publication Data

US 2022/0360185 A1 Nov. 10, 2022

Related U.S. Application Data

(63) Continuation of application No. 17/106,343, filed on Nov. 30, 2020, now Pat. No. 11,404,966.

(Continued)

(51) Int. Cl.
*H02M 3/335* (2006.01)
*H02M 1/00* (2006.01)
(Continued)

(52) U.S. Cl.
CPC ..... *H02M 3/33584* (2013.01); *H02M 1/0064* (2021.05); *H02M 1/40* (2013.01); *H02M 1/0043* (2021.05); *H02M 3/01* (2021.05)

(58) Field of Classification Search
CPC .. H02M 3/33584; H02M 1/0064; H02M 1/40; H02M 1/0043; H02M 3/01
See application file for complete search history.

(56) References Cited

U.S. PATENT DOCUMENTS 3,099,784 A * 7/1963 Kapell .................... H01F 38/04
363/12
3,983,469 A * 9/1976 Brown ................ H02M 7/1626
323/224

(Continued)

FOREIGN PATENT DOCUMENTS

CN      206041839 U     3/2017
JP       2012210104 A    10/2012

(Continued)

*Primary Examiner* — Yusef A Ahmed
(74) *Attorney, Agent, or Firm* — KIRTON McCONKIE; Evan R. Witt

(57) ABSTRACT

The present disclosure provides an isolated multi-phase DC/DC converter with a reduced quantity of blocking capacitors. In one aspect, the converter includes a multi-phase transformer having a primary circuit and a secondary circuit magnetically coupled to the primary circuit, the primary circuit having a first quantity of terminals, and the secondary circuit having a second quantity of terminals; a third quantity of blocking capacitors, each being electrically connected in series to a respective one of the terminals of the primary circuit; and a fourth quantity of blocking capacitors, each being electrically connected in series to a respective one of the terminals of the secondary circuit. The third quantity is one less than the first quantity. The fourth quantity is one less than the second quantity.

11 Claims, 6 Drawing Sheets

Related U.S. Application Data

(60) Provisional application No. 63/047,323, filed on Jul. 2, 2020.

(51) Int. Cl.
  *H02M 1/40* (2007.01)
  *H02M 3/00* (2006.01)

(56) References Cited

U.S. PATENT DOCUMENTS

| | | | | |
|---|---|---|---|---|
| 5,267,137 | A * | 11/1993 | Goebel | H02M 7/17 363/69 |
| 5,666,277 | A * | 9/1997 | Bjorklund | H02M 7/7575 363/64 |
| 6,574,125 | B2 * | 6/2003 | Matsukawa | H02M 3/33584 363/71 |
| 6,944,033 | B1 * | 9/2005 | Xu | H02M 3/1584 363/16 |
| 7,054,175 | B2 * | 5/2006 | Kurio | H02M 3/3376 363/65 |
| 9,197,135 | B2 * | 11/2015 | Matsubara | H02M 3/33584 |
| 9,236,755 | B2 * | 1/2016 | Chang | B60L 53/22 |
| 10,581,334 | B2 * | 3/2020 | Zong | H02M 3/01 |
| 10,715,050 | B2 * | 7/2020 | Torrico-Bascopé | H02M 3/33592 |
| 10,790,081 | B2 * | 9/2020 | Fei | H01F 27/2804 |
| 10,873,265 | B2 * | 12/2020 | Xue | H02M 3/33584 |
| 2006/0028187 | A1 * | 2/2006 | Kim | H02M 3/1584 323/272 |
| 2012/0163035 | A1 * | 6/2012 | Song | H02M 3/33584 363/17 |
| 2012/0320638 | A1 * | 12/2012 | Boysen | H02M 3/24 363/21.02 |
| 2013/0323137 | A1 * | 12/2013 | Averberg | B01J 8/0285 307/31 |
| 2015/0180350 | A1 * | 6/2015 | Huang | H02M 3/33584 307/66 |
| 2015/0280594 | A1 * | 10/2015 | Lin | H02M 3/28 363/21.04 |
| 2016/0197600 | A1 * | 7/2016 | Kuznetsov | H03K 3/45 307/106 |
| 2017/0085169 | A1 * | 3/2017 | Kravitz | H02M 1/126 |
| 2018/0198373 | A1 * | 7/2018 | Torrico-Bascopé | H02M 3/33592 |
| 2019/0288607 | A1 * | 9/2019 | Zong | H02M 3/33584 |
| 2019/0355506 | A1 * | 11/2019 | Fei | H01F 27/2804 |
| 2019/0379291 | A1 * | 12/2019 | Xue | H02M 7/219 |
| 2019/0379292 | A1 * | 12/2019 | Fei | H01F 3/14 |
| 2020/0044571 | A1 | 2/2020 | Bouchez | |
| 2020/0044572 | A1 * | 2/2020 | Bouchez | H02M 3/33584 |
| 2020/0136521 | A1 * | 4/2020 | Lin | H02M 3/01 |
| 2020/0274443 | A1 * | 8/2020 | Itogawa | H02M 3/33573 |
| 2021/0035727 | A1 * | 2/2021 | Umlauf | H02J 3/26 |
| 2021/0067048 | A1 * | 3/2021 | Zhang | H02M 3/01 |
| 2021/0083590 | A1 * | 3/2021 | Lu | H01F 38/08 |
| 2021/0099097 | A1 * | 4/2021 | Zhang | H02M 3/01 |
| 2021/0122255 | A1 * | 4/2021 | Liang | B60L 1/006 |
| 2021/0126550 | A1 * | 4/2021 | Yenduri | H02M 7/217 |
| 2021/0155100 | A1 * | 5/2021 | Khaligh | H02M 1/4208 |
| 2022/0014099 | A1 * | 1/2022 | Kim | H02M 3/33584 |
| 2023/0122794 | A1 * | 4/2023 | Gadelrab | H02M 1/0064 363/21.02 |

FOREIGN PATENT DOCUMENTS

| | | |
|---|---|---|
| JP | 2016012969 A | 1/2016 |
| JP | 2016012970 A | 1/2016 |
| JP | 2016140171 A | 8/2016 |
| JP | 2017005909 A | 1/2017 |
| WO | 2018147221 A1 | 8/2018 |
| WO | 2019123608 A1 | 6/2019 |

* cited by examiner

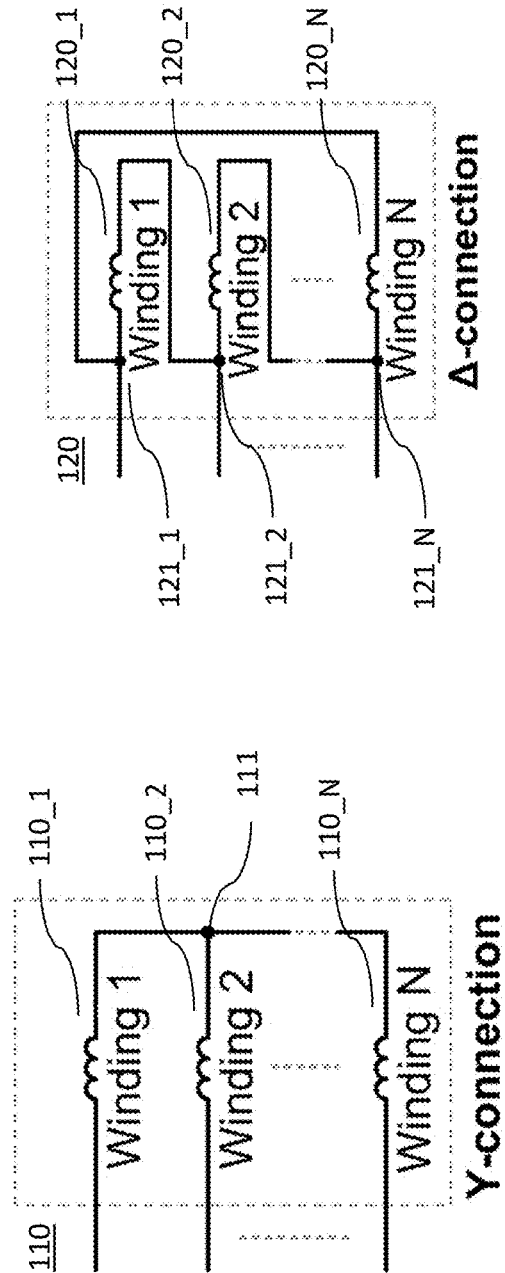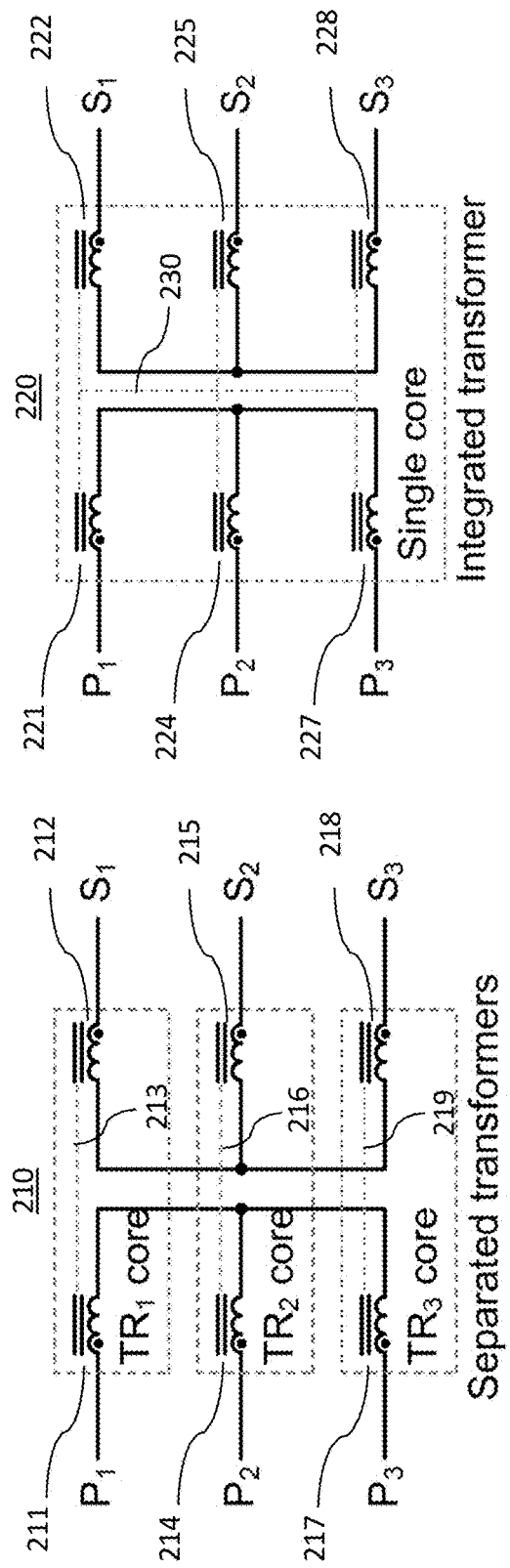
FIG. 1A  FIG. 1B
FIG. 2A  FIG. 2B

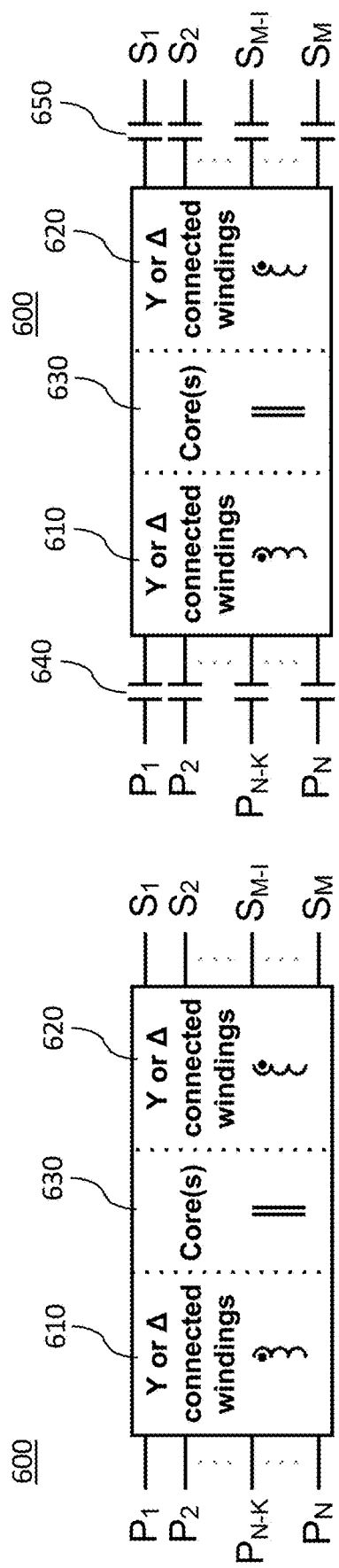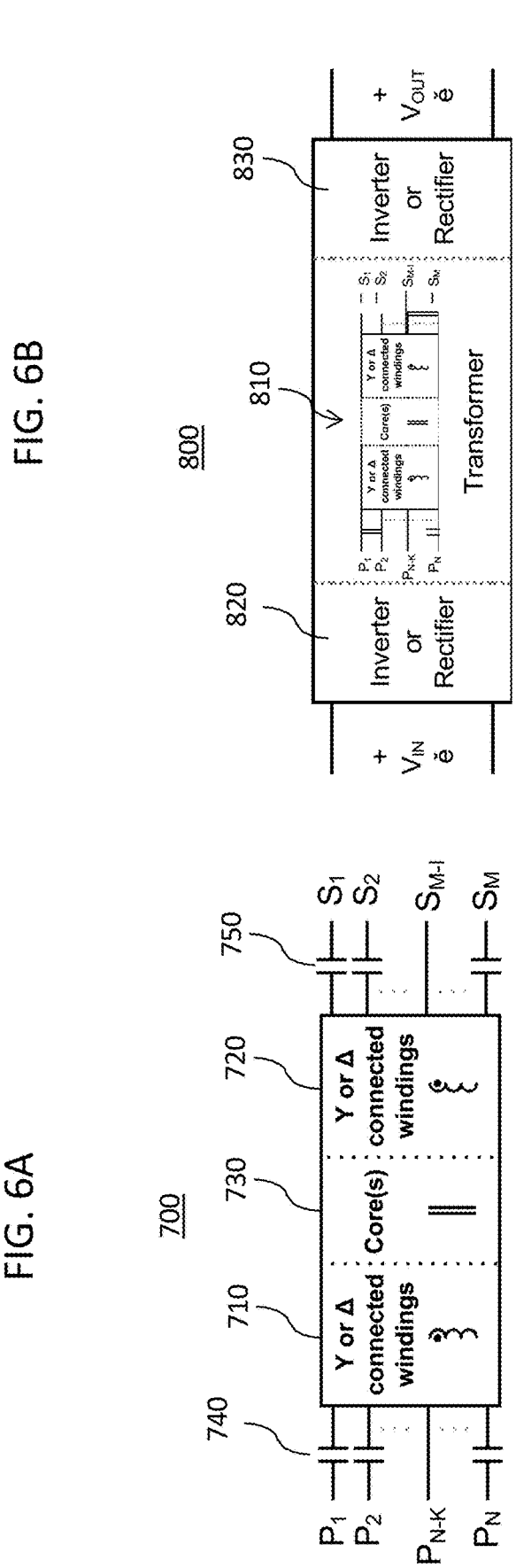

ISOLATED MULTI-PHASE DC/DC CONVERTER WITH REDUCED QUANTITY OF BLOCKING CAPACITORS

RELATED APPLICATION

This application is a continuation of U.S. application Ser. No. 17/106,343, filed on Nov. 30, 2020, which claims the benefit of priority to U.S. Provisional Application No. 63/047,323, filed Jul. 2, 2020, the entire contents of both of which are incorporated herein by reference for all purposes.

TECHNICAL FIELD

The present disclosure relates to a multi-phase DC/DC converter. More particularly, the present disclosure relates to an isolated multi-phase DC/DC converter with a reduced quantity of blocking capacitors.

BACKGROUND

In general, the power supply industry continuously demands converters with high efficiency, high power density, and low cost in order to achieve less energy consumption, smaller installation space, and cost effectiveness. In addition, higher power processing is required in many newly developed applications, such as electrical vehicles (EV) and data centers. By using higher power rated converters, charging time of EVs and the size of power racks in data centers can be significantly reduced.

Multi-phase converter topologies are commonly employed to increase processing power. In multi-phase converters, each phase delivers a portion of the total power. Since the current stress of each phase is only a fraction of the total current, the conduction loss as well as the temperature of components can be easily limited. In addition, the operation of each phase of the multi-phase converter can be interleaved, so that switching ripples of the phases can cancel each other and the filter size can be reduced significantly. Furthermore, multi-phase converters with multi-phase transformers can inherently achieve current sharing without any additional control. For these reasons, multi-phase DC/DC converters are attractive candidates in high power applications. See, for example, T. Jin and K. Smedley, "Multiphase LLC Series Resonant Converter for Microprocessor Voltage Regulation," *Conference Record of the* 2006 *Industry Applications Conference Forty-First IAS Annual Meeting*, vol. 5, pp. 2136-2143, October 2006; and J. Jacobs, A. Averberg and R. De. Doncker, "A Novel Three-Phase DC/DC Converter for High-Power Applications," 2004 35*th Annual IEEE Power Electronics Specialists Conference*, vol. 3, pp. 1861-1867, June 2004.

Although isolated multi-phase DC/DC converters show advantages in high power applications, it is still important to further improve efficiency, power density, and cost effectiveness.

SUMMARY

The present disclosure provides an isolated multi-phase DC/DC (direct current/direct current) converter with a reduced number of blocking capacitors that prevent saturation of the transformer. By using the fact that the current in a phase is equal to the sum of the currents in the other phases of the transformer, the blocking capacitor of the phase can be eliminated, because the DC components of the other phases can be eliminated by their own blocking capacitors.

The DC/DC converter of the present disclosure can achieve both cost effectiveness and higher power density, because one blocking capacitor bank at the primary side and one blocking capacitor bank at the secondary side can be eliminated in a multi-phase transformer.

In one aspect, the isolated multi-phase DC/DC converter comprises a multi-phase transformer having a primary circuit and a secondary circuit magnetically coupled to the primary circuit, the primary circuit having a first quantity of terminals, and the secondary circuit having a second quantity of terminals; a third quantity of blocking capacitors, each being electrically connected in series to a respective one of the terminals of the primary circuit; and a fourth quantity of blocking capacitors, each being electrically connected in series to a respective one of the terminals of the secondary circuit; wherein the third quantity is one less than the first quantity; and wherein the fourth quantity is one less than the second quantity.

In one embodiment, the converter further comprises a first inverter or a first rectifier electrically connected to the primary circuit of the multi-phase transformer; and a second inverter or a second rectifier electrically connected to the secondary circuit of the multi-phase transformer.

In one embodiment, the converter further comprises a primary voltage source electrically coupled to the first inverter or the first rectifier; and a secondary voltage source electrically coupled to the second inverter or the second rectifier.

In one embodiment, the first quantity is at least two and the third quantity is one less than the first quantity.

In one embodiment, the second quantity is at least two and the fourth quantity is one less than the second quantity.

In one embodiment, the primary circuit includes the first quantity of windings connected with each other in a Y-connection configuration or a Δ-connection configuration, and the secondary circuit includes the second quantity of windings connected with each other in a Y-connection configuration or a Δ-connection configuration.

In one embodiment, the primary and secondary circuits comprise one of Y-Y winding pairs, Y-Δ winding pairs, Δ-Y winding pairs, and Δ-Δ winding pairs.

In one embodiment, said first quantity of windings of the primary circuit and said second quantity of windings of the secondary circuit are magnetically coupled through a single magnetic core or a plurality of independent magnetic cores.

In another aspect, the present disclosure provides an electrical circuit for converting electrical power. The electrical circuit comprises a primary circuit; and a secondary circuit magnetically coupled to the primary circuit; wherein the primary circuit includes a plurality of terminals, each being electrically coupled to the primary circuit via a primary blocking capacitor, except that at most one of the terminals of the primary circuit is electrically coupled directly to the primary circuit without the primary blocking capacitor.

In one embodiment, the secondary circuit includes a plurality of terminals, each being electrically coupled to the secondary circuit via a secondary blocking capacitor, except that at most one of the terminals of the secondary circuit is electrically coupled directly to the secondary circuit without the secondary blocking capacitor.

In one embodiment, the primary circuit comprises a plurality of windings connected with each other in a Y-connection configuration or a Δ-connection configuration.

In one embodiment, the secondary circuit comprises a plurality of windings connected with each other in a Y-connection configuration or a Δ-connection configuration.

In one embodiment, the primary circuit and the secondary circuit are magnetically coupled through a single magnetic core or a plurality of independent magnetic cores.

In one embodiment, the primary circuit includes at least two terminals and wherein at most one of the at least two terminals of the primary circuit is electrically coupled directly to the primary circuit without the primary blocking capacitor, and each of the remaining terminals of the primary circuit is electrically coupled to the primary circuit via the primary blocking capacitor.

In one embodiment, the secondary circuit includes at least two terminals and wherein at most one of the at least two terminals of the secondary circuit is electrically coupled directly to the secondary circuit without the secondary blocking capacitor, and each of the remaining terminals of the secondary circuit is electrically coupled to the secondary circuit via the secondary blocking capacitor.

In still another aspect, the present disclosure provides a multi-phase transformer. The transformer comprises at least two primary windings electrically coupled to each other in a Y-connection configuration or a Δ-connection configuration; at least two primary terminals electrically coupled respectively to said at least two primary windings; and at least one primary blocking capacitor, each being electrically coupled in series between a respective one of said at least two primary terminals and a respective one of said at least two primary windings; wherein at most one of said at least two primary terminals is electrically coupled directly to a respective one of said at least two primary windings without the blocking capacitor.

In one embodiment, the multi-phase transformer further comprises at least two secondary windings electrically coupled to each other in a Y-connection configuration or a Δ-connection configuration; at least two secondary terminals electrically coupled respectively to said at least two secondary windings; and at least one secondary blocking capacitor, each being electrically coupled in series between a respective one of said at least two secondary terminals and a respective one of said at least two secondary windings; wherein at most one of said at least two secondary terminals is electrically coupled directly to a respective one of said at least two secondary windings without the secondary blocking capacitor.

In one embodiment, said at most one of said at least two primary terminals and said at most one of said at least two secondary terminals are of the same phase.

In one embodiment, the said at most one of said at least two primary terminals and said at most one of said at least two secondary terminals are of different phases.

In one embodiment, said at least two secondary windings are magnetically coupled to said at least two primary windings through a single magnetic core or at least two independent magnetic cores.

BRIEF DESCRIPTION OF THE DRAWINGS

FIGS. 1A and 1B respectively illustrate Y-connection windings and Δ-connection windings for a multi-phase transformer.

FIGS. 2A and 2B respectively illustrate a multi-core three-phase transformer and a single-core three-phase transformer that can be employed in a three-phase converter.

FIGS. 6A and 6B respectively illustrate a schematic diagram of a multi-phase transformer without and with blocking capacitors.

FIG. 7 illustrates a schematic diagram of a multi-phase transformer with a reduced quantity of blocking capacitors, in accordance with an embodiment of the present disclosure.

FIG. 8 illustrates a schematic diagram of an isolated multi-phase DC/DC converter including a multi-phase transformer, in accordance with an embodiment of the present disclosure.

DETAILED DESCRIPTION

Figure 4:
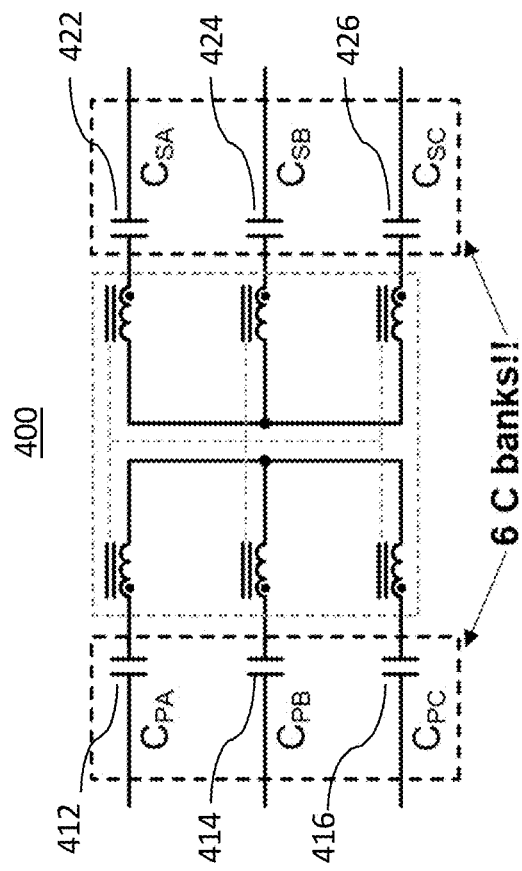
FIG. 4 illustrates a three-phase transformer that employs six capacitor banks.

FIGS. 1A and 1B respectively illustrate Y-connection windings 110 and Δ-connection windings 120. As shown in FIG. 1A, in the case of Y-connection, the right end of all windings 110-1 through 110-N is connected together at a same node 111, namely, a neutral point, while the left end of windings 110-1 through 110-N is a free end for current input/out. As shown in FIG. 1B, in the case of Δ-connection, one end of a winding is connected to the other end of a neighboring winding in sequence at nodes 121_1 through 121_N. For example, the right end of a first winding 120_1 is connected to the left end of a second winding 120_2 at node 121_2, while the left end of first winding 120_1 is connected to the right end of a last winding 120_N at node 121_N. In this manner, all windings 120_1 through 120_N are electrically coupled in series to form a closed loop with nodes 121_1 through 121_N serving as points for current input/output. Almost all the multi-phase transformers employ at least one of these two winding configurations to their primary and secondary sides.

FIGS. 2A and 2B respectively illustrate a multi-core three-phase transformer 210 and a single-core three-phase transformer 220 that can be employed in a three-phase converter. It should be noted that both the primary (left) and secondary (right) sides of transformer 210 and 220 use windings with the Y-connection configuration as shown in FIG. 1A.

As shown in FIG. 2A, windings 211, 214, and 217 are connected in Y-connection configuration with terminals P1, P2, and P3, thereby forming the primary side of transformer 210, while windings 212, 215, and 218 are connected in Y-connection configuration with terminals S1, S2, and S3, thereby forming the secondary side of transformer 210. As depicted by dashed lines in FIG. 2A, three pairs of windings (i.e., winding pair 211 and 212, winding pair 214 and 215, and winding pair 217 and 218) are magnetically coupled to serve as a three-phase transformer that can be employed to an isolated three-phase converter. As shown in FIG. 2A, three-phase transformer 210 can be implemented with three independent magnetic cores 213, 216, and 219. As shown in FIG. 2B, three-phase transformer 220 is substantially the same as three-phase transformer 210 shown in FIG. 2A, except that three-phase transformer 220 is implemented with a single magnetic core 230 that integrates the magnetic couplings of winding pair 221 and 222, winding pair 224 and 225, and winding pair 227 and 228. It is appreciated that single magnetic core 230 and independent magnetic cores 213, 216, and 219 are made of any suitable magnetic material (e.g., iron, cobalt, and nickel) with a high magnetic permeability so as to confine and guide magnetic fields.

An isolated DC/DC converter may utilize a transformer to provide galvanic isolation. To guarantee reliable operation of the DC/DC converter, it is extremely important to avoid saturation of the magnetic cores of the transformer by excessive flux density. To minimize the maximum flux density in the magnetic core, the DC component of the magnetizing current of the transformer should be zero. Note that magnetizing current is the current drawn by the primary side of a transformer that is being magnetized or energized at a specific voltage, but the secondary side is not loaded.

One method to eliminate the DC component of the magnetizing current is connecting a blocking capacitor in series with the transformer. In a steady state condition when charge balance of the capacitor is met, i.e., the charging current of the capacitor is equal to the discharging current during a switching cycle, the capacitor blocks the DC component of the magnetizing current. As a result, the transformer operates reliably without excessive magnetic flux.

Figure 3:
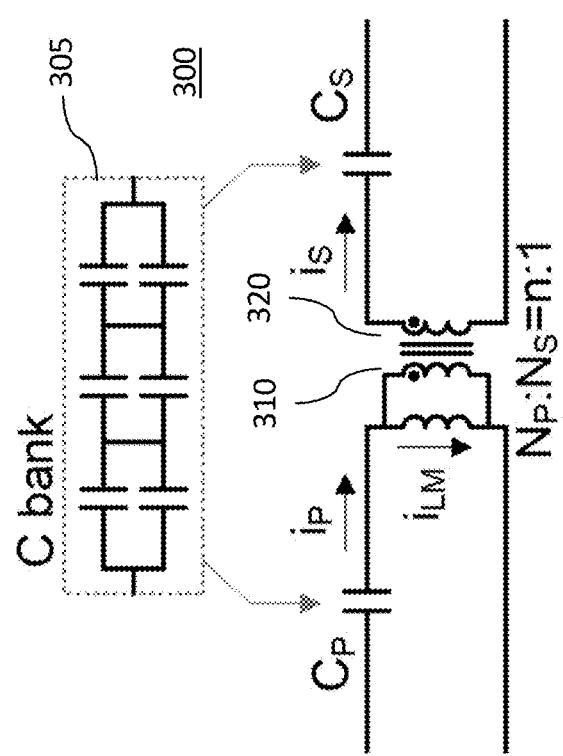
FIG. 3 illustrates a single-phase transformer with blocking capacitors.

FIG. 3 illustrates a single-phase transformer 300 with blocking capacitors $C_P$ and $C_S$. Blocking capacitors $C_P$ and $C_S$ are respectively connected in series with a primary winding 310 and a secondary winding 320. In one embodiment, blocking capacitors $C_P$ and $C_S$ can be a capacitor bank 305 including a plurality of capacitors connected in parallel and in series. For example, as shown in FIG. 3, capacitor bank 305 includes a total of six capacitors with three of the parallelly connected capacitor pairs being connected in series. It should be noted that transformer 300 as shown in FIG. 3 includes an ideal transformer with turns ratio $N_P:N_S=n:1$, and a magnetizing inductor $L_M$ connected in parallel with primary winding 310. The following equation represents the steady state condition when charge balance of the blocking capacitor is met, and hence, the DC component of magnetizing current $i_{LM}$ is zero.

$$\langle i_{LM}\rangle_{T_S} = \frac{1}{T_S}\int_0^{T_S} i_{LM} dt = \frac{1}{T_S}\int_0^{T_S}(i_p - i_s/n)dt = \frac{1}{T_S}\left(\int_0^{T_S} i_p dt - \int_0^{T_S} i_s/n dt\right) = 0, \quad (1)$$

where $T_S$, $i_P$, $i_S$, and $\langle i_{LM}\rangle_{T_S}$ represent the switching period of the converter, the current flowing through capacitor $C_P$, the current flowing through capacitor $C_S$, and the DC component of magnetizing current $i_{LM}$ which is equal to the average magnetizing current over switching period $T_S$. In one embodiment, switching period $T_S$ may be 0.5 to 10 times to the inverse of a resonant frequency v of the serially connected inductor $L_M$ and capacitor $C_P$ (where $v=\frac{1}{2\pi}\sqrt{L_M C_P}$). For example, switching period $T_S$ may be about 1 over several hundreds of kHz.

This method can be used to prevent saturation of transformer 300, because it does not require any additional control. However, in high power as well as high voltage applications, a plurality of capacitors are connected in series and in parallel to meet required voltage and current stresses, because commercially available capacitors have limited voltage and current ratings.

FIG. 4 illustrates a three-phase transformer 400 that employs windings with the Y-connection configuration for both the primary and secondary sides as shown in FIG. 2B. Each winding is coupled with a capacitor or a capacitor bank in series to eliminate the DC component of the magnetizing current in the three-phase transformer 400. In this example, six capacitor banks 412, 414, 416, 422, 424, and 426 are required to prevent saturation of transformer 400, which results in extra cost and lower power density of the DC/DC converter.

Figure 5:
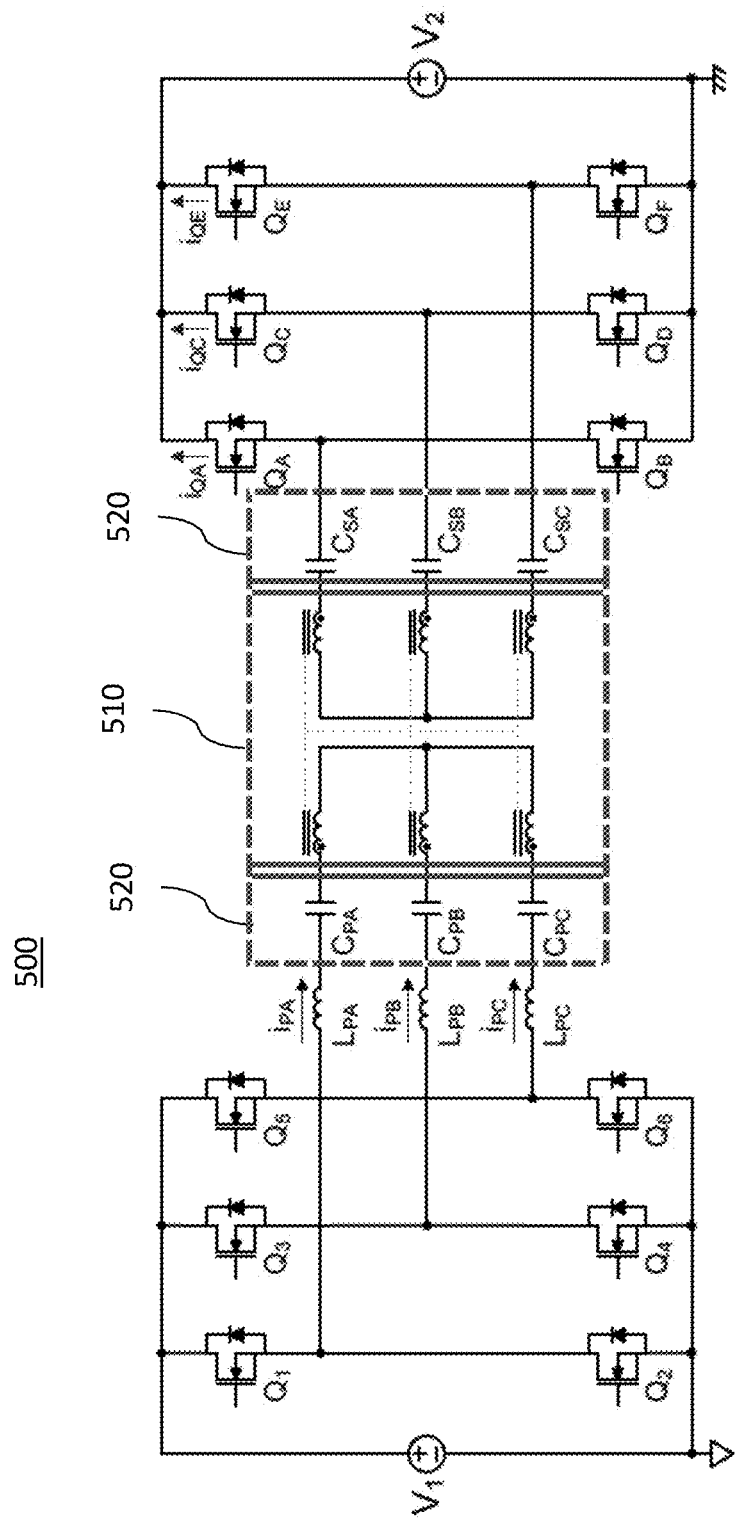
FIG. 5 illustrates a bi-directional isolated three-phase DC/DC converter with a three-phase transformer and blocking capacitors.

FIG. 5 illustrates a bi-directional isolated three-phase DC/DC converter 500 with a three-phase transformer 510 and blocking capacitors 520. Converter 500 delivers energy back and forth between two voltage sources V1 and V2. All three phases of the primary side are coupled to primary voltage source V1 and all three phases of the secondary side are coupled to secondary voltage source V2.

Each phase of converter 500 includes two switches coupled to a primary side of transformer 510 and two switches coupled to a corresponding secondary side of transformer 510. Specifically, as shown in FIG. 5, switches Q1 and Q2 are connected to phase A of the primary side of transformer 510 through an external inductor $L_{PA}$; switches Q3 and Q4 are connected to phase B of the primary side of transformer 510 through an external inductor $L_{PB}$; and switches Q5 and Q6 are connected to phase C of the primary side of transformer 510 through external inductor $L_{PC}$. Likewise, as shown in FIG. 5, switches QA and QB are connected to phase A of the secondary side of transformer 510; switches QC and QD are connected to phase B of the secondary side of transformer 510; and switches QE and QF are connected to phase C of the secondary side of transformer 510.

External inductors $L_{PA}$, $L_{PB}$, and $L_{PC}$ are connected in series with a respective winding of three-phase transformer 510 via a respective one of capacitors 520 to control the slope of the current through transformer 510. If the leakage inductance of each winding of the transformer is sufficiently large to control the slope of the current, external inductors $L_{PA}$, $L_{PB}$, and $L_{PC}$ become optional and can be removed.

Converter 500 in FIG. 5 is called an isolated three-phase dual-active-bridge converter, if its operating switching frequency is selected to be much higher (e.g., at least one order of magnitude higher) than a resonant frequency v of the serially connected inductor L and capacitor C (where $v=\frac{1}{2\pi}\sqrt{LC}$). On the other hand, converter 500 is also called an isolated three-phase resonant converter, if its operating switching frequency is designed to be close to the resonant frequency v. If the number of phases of an isolated DC/DC converter is greater than two, the converter is generally called an isolated multi-phase DC/DC converter. Also, it should be noted that blocking capacitors 520 should be implemented to prevent the DC component of the magnetizing current of transformer 510.

FIG. 6A illustrates a schematic diagram of a multi-phase transformer 600 without blocking capacitors. Primary side windings 610 and secondary side windings 620 of multi-phase transformer 600 can be a Y-connection configuration or Δ-connection configuration. A magnetic core 630 of transformer 600 can include a single core or multiple cores. The primary side has N phases, and each end of primary side windings 610 are referred to as $P_1, P_2, \ldots P_{N-K}, \ldots$ and $P_N$, where $0 \leq K \leq N-1$. The secondary side has M phases, and each end of secondary side windings 620 are referred to as $S_1, S_2, \ldots S_{M-I}, \ldots$ and $S_M$, where $0 \le I < M-1$. FIG. 6B illustrates a schematic diagram of multi-phase transformer 600 with blocking capacitors 640 and 650. In order to avoid the DC component of the magnetizing current of the transformer, each end of primary side windings 610 is connected in series with a blocking capacitor 640, and each end of secondary side windings 620 is connected in series with a blocking capacitor 650.

FIG. 7 illustrates a schematic diagram of a multi-phase transformer 700 with a reduced quantity of blocking capacitors 740 and 750, in accordance with an embodiment of the present disclosure. Multi-phase transformer 700 as shown in FIG. 7 is substantially the same as multi-phase transformer 600 in FIG. 6B, except that two blocking capacitors originally coupled to terminals $P_{N-K}$ and $S_{M-I}$ of multi-phase transformer 600 in FIG. 6B are removed to obtain multi-phase transformer 700 in FIG. 7. Primary side windings 710 and secondary side windings 720 of multi-phase transformer 700 can be a Y-connection configuration or Δ-connection configuration. It is appreciated that primary side windings 710 and secondary side windings 720 do not have to have the same connection configurations. For example, primary side windings 710 may have a Y-connection configuration, while secondary side windings 720 may have a Δ-connection configuration, and vice versa. One of primary side windings 710 and one of secondary side windings 720 may form a winding pair through a magnetic core 730. Accordingly, primary and secondary side windings 710 and 720 (with or without magnetic core 730) may form one of Y-Y winding pairs, Y-Δ winding pairs, Δ-Y winding pairs, and Δ-Δ winding pairs.

As shown in FIG. 7, although two capacitors are removed, it is still possible to block any DC component of the magnetizing current of transformer 700, because the average current through the winding for terminal $P_{N-K}$ is the sum of the average currents through all other windings at the primary side of transformer 700 and the average current through the winding of terminal $S_{M-I}$ is the sum of the average currents through all other windings at the secondary side of transformer 700. It should be noted that all windings except windings for terminals $P_{N-K}$ and $S_{M-I}$ are serially coupled to blocking capacitors 740 and 750 that eliminate DC components of the current. As a result, fewer electronic components are required in a DC/DC converter, which can be manufactured at a lower total cost and a smaller physical size. Although only one blocking capacitor is removed from a phase of either the primary side or the secondary side, it is appreciated that, under certain conditions, more than one blocking capacitors may be removed from each of the primary and secondary sides.

Figure 9:
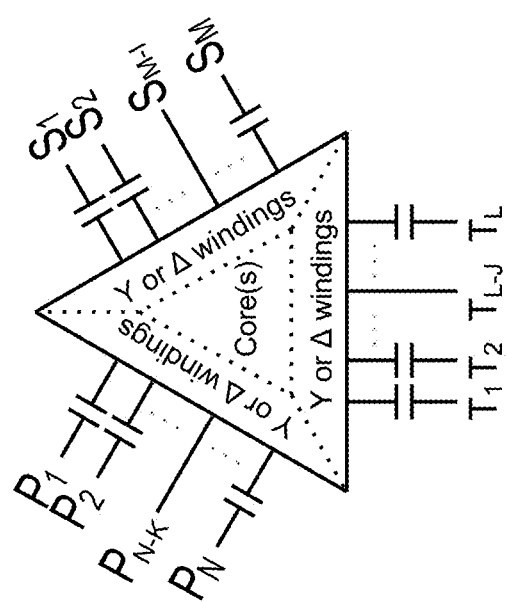
FIG. 9 illustrates a schematic diagram of an N-phase, three-port transformer, in accordance with an embodiment of the present disclosure.

FIG. 8 illustrates a schematic diagram of an isolated multi-phase DC/DC converter 800 including a multi-phase transformer 810, in accordance with an embodiment of the present disclosure. Converter 800 can employ one or more of inverter or rectifier circuits 820 and 830 at its primary and secondary sides to operate as an isolated multi-phase DC/DC converter. It is appreciated that the concept of reduced quantity of blocking capacitors can be applied to any suitable multi-phase, multi-port transformer for any suitable multi-phase, multi-output converter. For example, FIG. 9 illustrates a schematic diagram of an N-phase, three-port transformer with one of the blocking capacitors being removed at each of the primary, secondary, and tertiary sides.

Figure 10A:
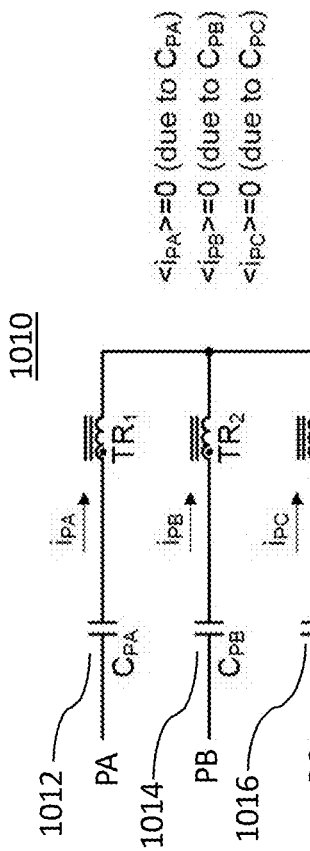
FIG. 10A illustrates the primary side of a Y-Y connected three-phase transformer, with each terminal at the primary side being connected to a blocking capacitor.
Figure 10B:
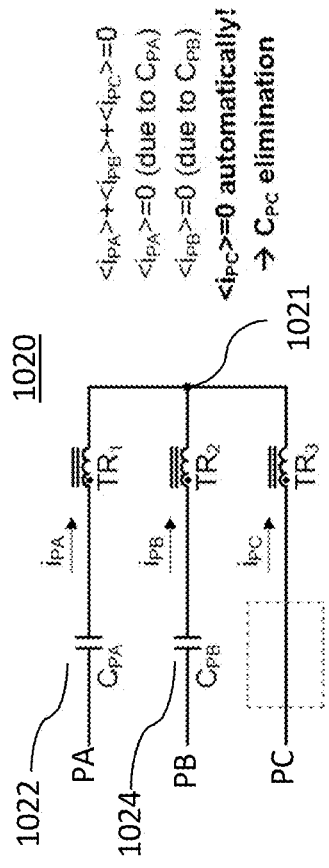
FIG. 10B illustrates the primary side of a Y-Y connected three-phase transformer, with only two of three terminals at the primary side being connected to a blocking capacitor, in accordance with an embodiment of the present invention.

FIG. 10A illustrates the primary side of a Y-Y connected three-phase transformer 1010, with each of three terminals PA, PB, and PC at the primary side being connected to a respective one of blocking capacitors 1012, 1014, and 1016, similar to that as shown in FIG. 4. It is noted that the DC component of the current in each phase winding is zero due to charge balance of blocking capacitors 1012, 1014, and 1016. In contrast, FIG. 10B illustrates the primary side of a Y-Y connected three-phase transformer 1020, with only two terminals PA and PB at the primary side being respectively connected to blocking capacitors 1022 and 1024, in accordance with an embodiment of the present invention. Note that blocking capacitor 1016 originally present in transformer 1010 of FIG. 10A is absent from transformer 1020 of FIG. 10B.

By applying Kirchhoff's current law to a neutral point 1021 of the Y-connected windings as shown in FIG. 10B, the following equation is obtained:

$$i_{PA} + i_{PB} + i_{PC} = 0, \quad (2)$$

where $i_{PA}$, $i_{PB}$, and $i_{PC}$ respectively represent the currents in terminals PA, PB, and PC. One can take an average of currents $i_{PA}$, $i_{PB}$, and $i_{PC}$ in Equation (2) over a switching period $T_S$, which gives:

$$<i_{PA}> + <i_{PB}> + <i_{PC}> = 0, \text{ or} \quad (3)$$

$$<i_{PA}> = -<i_{PB}> - <i_{PC}>, \quad (4)$$

where $<i_{PA}>$, $<i_{PB}>$, and $<i_{PC}>$ respectively represent the average values of currents $i_{PA}$, $i_{PB}$, and $i_{PC}$ over switching period Ts. Due to charge balances of capacitors $C_{PA}$ and $C_{PB}$, the average values of currents $i_{PA}$ and $i_{PB}$ are both zero, i.e.:

$$<i_{PA}> = 0, \text{ and} \quad (5)$$

$$<i_{PB}> = 0. \quad (6)$$

By substituting Equations (5) and (6) into Equation (4), the average value of current $i_{PC}$ becomes:

$$<i_{PC}> = 0. \quad (7)$$

Therefore, the presence or absence of a blocking capacitor at terminal PC does not make a difference for transformer 1020, especially when charge balance of the capacitors is met. Although the present disclosure describes the removal of capacitor $C_{PC}$ in transformer 1010 having a Y-connected configuration, it is appreciated that any arbitrary one of capacitors $C_{PA}$, $C_{PB}$, and $C_{PC}$ can be removed from transformer 1010 to achieve the same results. It is also appreciated that the removal of one of capacitors $C_{PA}$, $C_{PB}$, and $C_{PC}$ works in the same manner for transformers having a Δ-connected configuration.

Figure 11A:
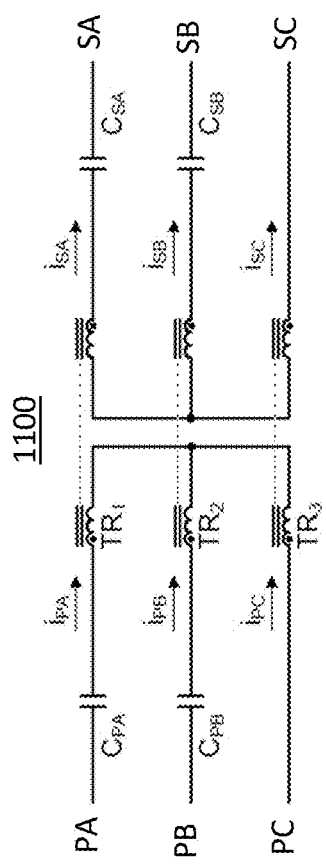
FIGS. 11A and B respectively illustrate a multi-phase transformer with a reduced quantity of blocking capacitors, in accordance with an embodiment of the present disclosure.
Figure 11B:
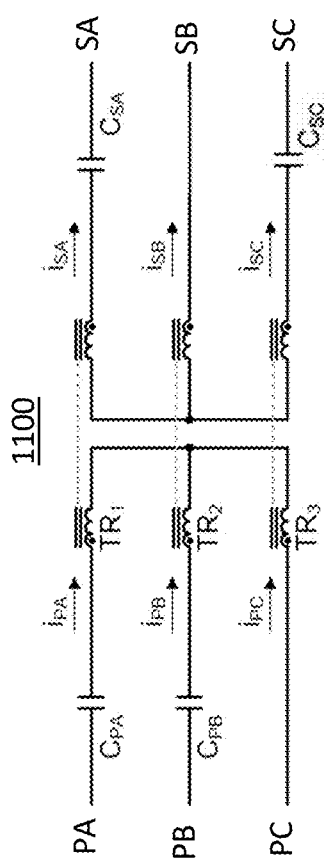

FIGS. 11A and 11B respectively illustrate a multi-phase transformer 1100 with a reduced quantity of blocking capacitors, in accordance with an embodiment of the present disclosure. As shown in FIG. 11A, each of terminals PA and PB at the primary side and terminals SA and SB at the secondary side includes a blocking capacitor connected therewith in series, while terminal PC at the primary side and terminal SC at the secondary side (both of phase C) do not have a blocking capacitor connected therewith. This is the case for a dual-active bridge (DAB) DC/DC converter, where the removed blocking capacitors at the primary and secondary sides must be for the same phase, because the resonant frequency for a DAB converter is much smaller than the switching frequency. It is appreciated that, in alternative embodiments, the blocking capacitors for either phase A or phase B at both primary and secondary sides can be removed.

For blocking capacitors having a capacitance that is synchronous to the switching frequency (namely, the resonant frequency is commensurate with the switching frequency), the removed blocking capacitors at the primary and secondary sides must be of different phases. For example, as shown in FIG. 11B, the blocking capacitor of terminal PC (phase C) at the primary side is removed, while the blocking capacitor of terminal SB (phase B, different from phase C) at the secondary side is removed. It is appreciated that, in alternative embodiments, if the blocking capacitor for phase A at the primary side is removed, the blocking capacitor for either phase B or phase C at the secondary side can be removed.

For three-phase transformer 1100 as shown in FIGS. 11A and 11B, this results in the saving of one-third (⅓) or 33% on the total material cost for blocking capacitors. For a five-phase transformer, for example, this results in the saving of one-third (⅕) or 20% on the total material cost for blocking capacitors.

For the purposes of describing and defining the present disclosure, it is noted that terms of degree (e.g., "substantially," "slightly," "about," "comparable," etc.) may be utilized herein to represent the inherent degree of uncertainty that may be attributed to any quantitative comparison, value, measurement, or other representation. Such terms of degree may also be utilized herein to represent the degree by which a quantitative representation may vary from a stated reference (e.g., about 10% or less) without resulting in a change in the basic function of the subject matter at issue. Unless otherwise stated herein, any numerical value appearing in the present disclosure are deemed modified by a term of degree (e.g., "about"), thereby reflecting its intrinsic uncertainty.

Although various embodiments of the present disclosure have been described in detail herein, one of ordinary skill in the art would readily appreciate modifications and other embodiments without departing from the spirit and scope of the present disclosure as stated in the appended claims.

What is claimed is:

1. An isolated multi-phase DC/DC converter comprising:
    a first inverter or rectifier circuit at a primary side of the isolated multi-phase DC/DC converter, the first inverter or rectifier circuit comprising a first number of phases that are each configured to be coupled to a first voltage source;
    a second inverter or rectifier circuit at a secondary side of the isolated multi-phase DC/DC converter, the second inverter or rectifier circuit comprising the first number of phases that are each configured to be coupled to a second voltage source;
    a multi-phase transformer comprising the first number of primary side windings that are each connected to a respective one of the first number of phases of the first inverter or rectifier circuit and the first number of secondary side windings that are each connected to a respective one of the first number of phases of the second inverter or rectifier circuit, each of the first number of primary side windings being magnetically coupled to a respective one of the first number of secondary side windings via one or more magnetic cores; and
    a second number of blocking capacitors on the primary side of the isolated multi-phase DC/DC converter, the second number being one less than the first number, each of the second number of blocking capacitors on the primary side of the isolated multi-phase DC/DC converter being directly connected in series between one of the first number of phases of the first inverter or rectifier circuit and the respective one of the first number of primary side windings such that a blocking capacitor is not connected in series between a remaining one of the first number of phases of the first inverter or rectifier circuit and the respective remaining one of the first number of primary side windings;
    wherein the first number is at least three;
    wherein each of the second number of blocking capacitors on the primary side of the isolated multi-phase DC/DC converter blocks DC components of a magnetizing current flowing through the respective one of the first number of primary side windings;
    wherein the second number of blocking capacitors on the primary side of the isolated multi-phase DC/DC converter cause an average value of a magnetizing current flowing through the remaining one of the first number of primary side windings to equal a sum of average values of the magnetizing currents flowing through the others of the first number of primary side windings over a predetermined period of time, wherein the predetermined period of time corresponds to a resonant frequency of the isolated multi-phase DC/DC converter and wherein the resonant frequency is synchronous with a switching frequency; and
    wherein the first number of primary side windings are connected with each other in a Y-connection configuration or a Δ-connection configuration, and the first number of secondary side windings are connected with each other in a Y-connection configuration or a Δ-connection configuration to thereby form Y-Y winding pairs, Y-Δ winding pairs, Δ-Y winding pairs, or Δ-Δ winding pairs.

2. The isolated multi-phase DC/DC converter of claim 1, further comprising:
    a second number of blocking capacitors on the secondary side of the isolated multi-phase DC/DC converter, the second number of blocking capacitors on the secondary side being one less than the first number, each of the second number of blocking capacitors on the secondary side of the isolated multi-phase DC/DC converter being connected between one of the first number of phases of the second inverter or rectifier circuit and the respective one of the first number of secondary side windings such that a blocking capacitor is not coupled between a remaining one of the first number of phases of the secondary inverter or rectifier circuit and the respective remaining one of the first number of secondary side windings.

3. The isolated multi-phase DC/DC converter of claim 2, wherein the respective remaining one of the first number of primary side windings is magnetically coupled to the respective remaining one of the first number of secondary side windings.

4. The isolated multi-phase DC/DC converter of claim 2, wherein the one or more magnetic cores is a single magnetic core.

5. The isolated multi-phase DC/DC converter of claim 2, wherein the first number is three.

6. The isolated multi-phase DC/DC converter of claim 1, wherein the one or more magnetic cores is a single magnetic core.

7. The isolated multi-phase DC/DC converter of claim 1, wherein the first number is three.

8. An isolated multi-phase DC/DC converter comprising:
    a first inverter or rectifier circuit at a primary side of the isolated multi-phase DC/DC converter, the first inverter or rectifier circuit comprising three phases that are each configured to be coupled to a first voltage source;

a second inverter or rectifier circuit at a secondary side of the isolated multi-phase DC/DC converter, the second inverter or rectifier circuit comprising three phases that are each configured to be coupled to a second voltage source;

a multi-phase transformer comprising three primary side windings that are each connected to a respective one of the three phases of the first inverter or rectifier circuit and three secondary side windings that are each connected to a respective one of the three phases of the second inverter or rectifier circuit, each of the three primary side windings being magnetically coupled to a respective one of the three secondary side windings via one or more magnetic cores; and two blocking capacitors on the primary side of the isolated multi-phase DC/DC converter, each of the two blocking capacitors on the primary side of the isolated multi-phase DC/DC converter being directly connected in series between respective first and second phases of the three phases of the first inverter or rectifier circuit and respective first and second windings of the three primary side windings such that a blocking capacitor is not connected in series between a third phase of the three phases of the first inverter or rectifier circuit and a third winding of the three primary side windings;

wherein each of the two blocking capacitors on the primary side of the isolated multi-phase DC/DC converter blocks DC components of a magnetizing current flowing through the respective first and second windings of the three primary side windings;

wherein the two blocking capacitors on the primary side of the isolated multi-phase DC/DC converter cause an average value of a magnetizing current flowing through the third winding of the three primary side windings to equal a sum of average values of the magnetizing currents flowing through the first and second windings of the three primary side windings over a predetermined period of time, wherein the predetermined period of time corresponds to a resonant frequency of the isolated multi-phase DC/DC converter and wherein the resonant frequency is synchronous with a switching frequency; and wherein the three primary side windings are connected with each other in a Y-connection configuration or a Δ-connection configuration, and the three secondary side windings are connected with each other in a Y-connection configuration or a Δ-connection configuration to thereby form Y-Y winding pairs, Y-Δ winding pairs, Δ-Y winding pairs, or Δ-Δ winding pairs.

9. The isolated multi-phase DC/DC converter of claim 8, further comprising:

at least one more primary side winding and corresponding at least one more blocking capacitor.

10. The isolated multi-phase DC/DC converter of claim 8, further comprising:

two blocking capacitors on the secondary side of the isolated multi-phase DC/DC converter, each of the two blocking capacitors on the secondary side of the isolated multi-phase DC/DC converter being connected in series between respective first and second phases of the three phases of the second inverter or rectifier circuit and respective first and second windings of the three secondary side windings such that a blocking capacitor is not connected in series between a third phase of the three phases of the second inverter or rectifier circuit and a third winding of the three secondary side windings.

11. The isolated multi-phase DC/DC converter of claim 10, wherein the third winding of the three primary side windings is magnetically coupled to the third winding of the three secondary side windings.

* * * * *